United States Patent [19]

Yoshitsugu

[11] Patent Number: 4,763,750

[45] Date of Patent: Aug. 16, 1988

[54] SEATBELT ASSEMBLY

[75] Inventor: Noritada Yoshitsugu, Aichi, Japan

[73] Assignee: Toyota Jidosha Kabushiki Kaisha, Aichi, Japan

[21] Appl. No.: 41,044

[22] Filed: Apr. 21, 1987

[30] Foreign Application Priority Data

May 27, 1986 [JP] Japan .............................. 61-79768[U]

[51] Int. Cl.$^4$ ............................................. B60R 21/00
[52] U.S. Cl. ..................................... 180/268; 280/804
[58] Field of Search ................ 280/802, 804; 180/268, 180/269, 270

[56] References Cited

U.S. PATENT DOCUMENTS

| 3,963,090 | 6/1976 | Hollins | 180/268 |
| 4,317,583 | 3/1982 | Pilhall | 280/804 |
| 4,343,489 | 8/1982 | Suzuki et al. | 280/804 |
| 4,553,625 | 11/1985 | Tsuge et al. | 180/270 |
| 4,574,911 | 3/1986 | North | 180/270 |

FOREIGN PATENT DOCUMENTS

| 2653124 | 5/1978 | Fed. Rep. of Germany | 180/268 |
| 3215801 | 11/1983 | Fed. Rep. of Germany | 180/268 |
| 2463028 | 2/1981 | France | 180/268 |
| 58-64358 | 4/1983 | Japan . | |
| 609286 | 2/1979 | Switzerland | 180/268 |

Primary Examiner—Kenneth R. Rice
Attorney, Agent, or Firm—Parkhurst & Oliff

[57] ABSTRACT

A seatbelt assembly for automatically releasing a vehicle occupant from the restraint of a seatbelt or plurality of belts. The seatbelt assembly includes a first restraining webbing, a second restraining webbing, a buckle, a retractor and a sensor. The first restraining webbing automatically fastens an occupant to a seat in a vehicle, and the first restraining webbing is positioned at one of first and second positions. The second restraining webbing is manually operated to fasten an occupant to the seat. The buckle is located at a first side of the seat and the second restraining webbing selectively engages the buckle. The buckle includes a locking plate and an actuator, and the actuator disengages the second restraining webbing from the locking plate. The retractor winds the second restraining webbing, and the retractor is located at a second side of the seat. Accordingly, when the second restraining webbing engages the buckle an occupant on the seat is restrained by the second restraining webbing, and when the first restraining webbing is positioned at the second position and the second restraining webbing and the buckle are disengaged, an occupant on the seat is released from the restraint of the first and second restraining webbings. Sensors and the ECU are provided to determine when the occupant is getting out of the vehicle, and for providing a signal to the actuator so as to release the occupant from the restraint of the seatbelts.

20 Claims, 21 Drawing Sheets

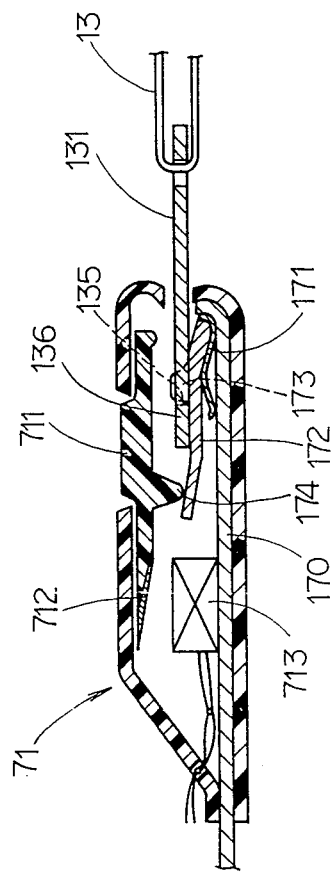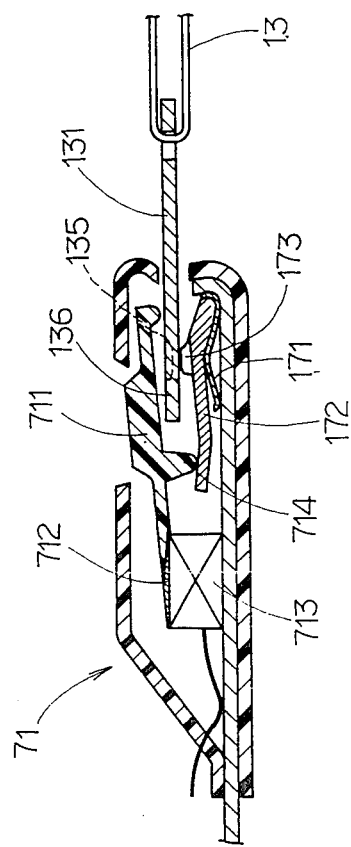

SEATBELT ASSEMBLY

BACKGROUND OF THE INVENTION

The present invention relates to an automatically fastening seatbelt assembly which is automatically applied to a vehicle occupant, to hold the occupant to a seat in the vehicle by a shoulder restraining webbing after the occupant is positioned on the seat in the vehicle. The seatbelt assembly includes a guide rail, a slider which is displaceable along the guide rail, the shoulder restraining webbing which is fixed to the slider at one end thereof, a buckle member which is located beside a seat and a manually operated lap restraining webbing. The shoulder restraining webbing automatically holds the occupant to the seat, while the lap restraining webbing is manually engaged to hold the lap of the occupant to the seat. More particularly, the present invention relates to improvements in an automatic releasing means for releasing an occupant from the restraint of the shoulder and lap restraining webbings.

A conventional automatically fastening seatbelt assembly is disclosed in U.S. Pat. No. 4,343,489. This patent discloses a seatbelt system which includes a guide rail having a longitudinal guide groove therein. The guide rail is fixed on a roof side member of a vehicle, and a slider slides within the guide groove and is displaceable along the guide rail. Further, a shoulder restraining webbing is fixed to the slider at one end thereof. A retractor member is located beside a seat in a vehicle. The other end of the restraining webbing is wound up in the retractor member.

Accordingly, the shoulder restraining webbing crosses the occupant's chest diagonally to hold the occupant to the seat.

Another conventional seatbelt assembly is disclosed in Japanese Utility Model application Laid-Open Sho No. 58-64358. This patent discloses a seatbelt fastening mechanism which includes a buckle member and a restraining webbing. The restraining webbing further includes an engagement plate. The buckle member includes a locking plate, a release member, and an actuator. In an engagement condition, the engagement plate of the restraining webbing engages the locking plate of the buckle member. On the other hand, in a disengagement condition, the engagement plate is released from the locking plate by automatic operation of the actuator and the release member of the buckle member.

However, this seatbelt fastening mechanism does not relate to the automatic fastening seatbelt assembly, so that the seatbelt fastening mechanism releases the engagement plate from the buckle member independently of the automatically fastening seatbelt assembly.

SUMMARY OF THE INVENTION

The present invention was developed in view of the foregoing background and to overcome the foregoing drawbacks. It is accordingly an object of this invention to provide a seatbelt assembly which can automatically release an occupant on a seat in a vehicle from the restraint of first and second restraining webbings when the occupant gets out of the vehicle.

To achieve automatically release of an occupant from the restraint of the first and second restraining webbings, an automatic releasing seatbelt assembly includes a first restraining webbing, a second restraining webbing, a buckle means, a second retracting means and a first detecting means.

The first restraining webbing automatically fastens an occupant to the vehicle seat, and is positioned at one of first and second positions.

Accordingly, when the first restraining webbing is positioned at the first position, the first restraining webbing fastens an occupant to the seat.

The is manually operated and may be manually positioned so as to fasten an occupant to the vehicle seat.

The buckle means is located at a first side of the seat and the second restraining means is selectively engaged with the buckle means. The buckle means includes a locking means and a second actuator means which disengages the second restraining webbing from the locking means.

The second retracting means winds the second restraining webbing, and the second retracting means is located at a second side of the seat. Accordingly, when the second restraining webbing is engaged with the buckle means an occupant on the vehicle seat is restrained by the second restraining webbing, and when the first restraining webbing is positioned at the second position and the second restraining webbing disengages from the buckle means, an occupant on the seat is released from the restraint of the first and second restraining webbings.

The first detecting means detects when an operation occupant is getting out of the vehicle, and outputs a first signal to the actuator means. Upon receipt of the first signal from the first detecting means, the actuator means disengages the locking means from the second restraining webbing.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements:

FIG. 17 is an enlarged cross-sectional view of an inner buckle of a second embodiment, wherein a release button is positioned at a non-operation position;

FIG. 18 is an enlarged cross-sectional view of the inner buckle of the second embodiment, wherein the release button is actuated by a second actuator mechanism of the second embodiment;

DETAILED DESCRIPTION OF THE PREFERRED EMBODIMENTS

The present invention will be described in detail with reference to the accompanying drawings which illustrate preferred different embodiments according to the present invention.

Figure 1:
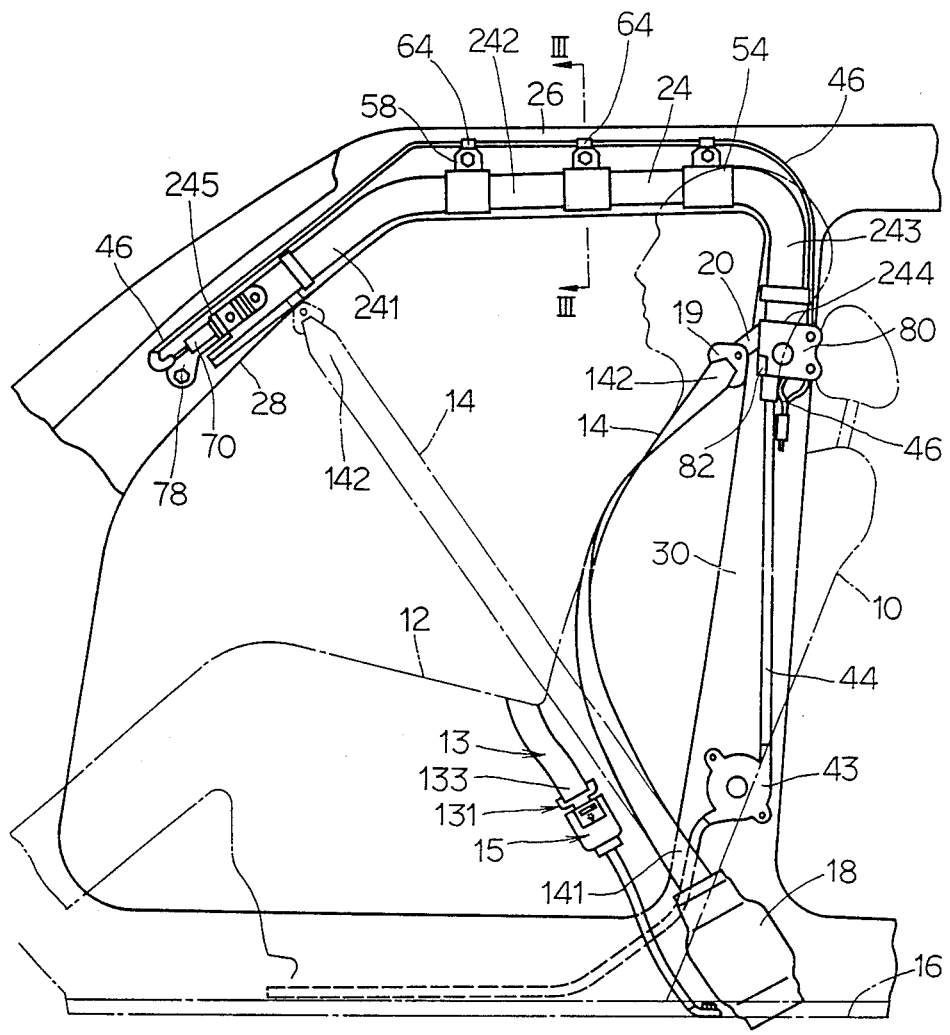
FIG. 1 is a side view of a seatbelt assembly according to the present invention installed on a passenger side of a vehicle, as viewed from a driver's side of the vehicle.

Referring to FIG. 1, a shoulder restraining webbing (or belt) 14 is designed such that it extends and surrounds the upper body (e.g., chest) of an occupant 12, when the occupant 12 is positioned upon the seat 10. Further, when the vehicle door 11 (shown in FIG. 2) is opened, the location of the shoulder restraining webbing 14 is represented by the broken line. An inner retractor 18 functions as a first retracting means adapted to wind a first portion 141 of the webbing 14 therein. The inner retractor 18 is secured to a floor member 16 of a vehicle. The inner retractor 18 is located at a substantially central portion in the lateral direction of the vehicle. The inner retractor 18 includes a locking mechanism which prevents an abrupt windoff of the shoulder restraining webbing 14 in an emergency situation.

Figure 3:
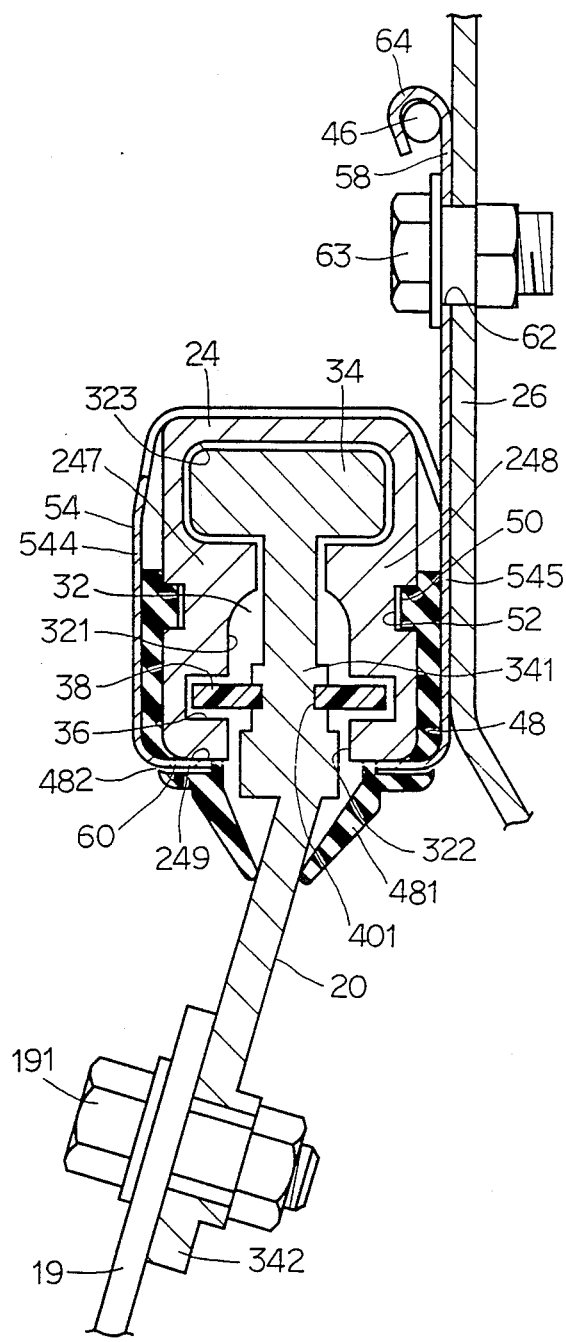
FIG. 3 is an enlarged cross-sectional view taken along the line III—III in FIG. 1, wherein a slider is disposed on the line III—III in FIG. 1.

An outer portion 142 of the shoulder restraining webbing 14 is connected to a slider 20 by an anchor plate 19. As shown in FIG. 3, the slider 20 is located within a guide groove 32 defined within a guide rail 24. The guide rail 24 is fixed on a front pillar 28, a roof side member 26 and a center pillar 30 of the vehicle. A slanted front portion 241 of the guide rail 24 is secured to the front pillar 28. A horizontal central portion 242 of the guide rail 24 is secured to the roof side member 26. A vertical rear portion 243 of the guide rail 24 is secured to the center pillar 30. Further, the guide groove 32 extends in the longitudinal direction along the guide rail 24, and the slider 20 is longitudinally displaceable along this guide groove 32.

As shown in FIG. 3, the slider 20 includes a heat portion 34 and a body portion 341, such that the slider 20 is substantially T-shaped in cross section. The body portion 341 includes a leg portion 342 at a lower end thereof. The head portion 34 is slidably received in a head groove 323.

Figure 4:
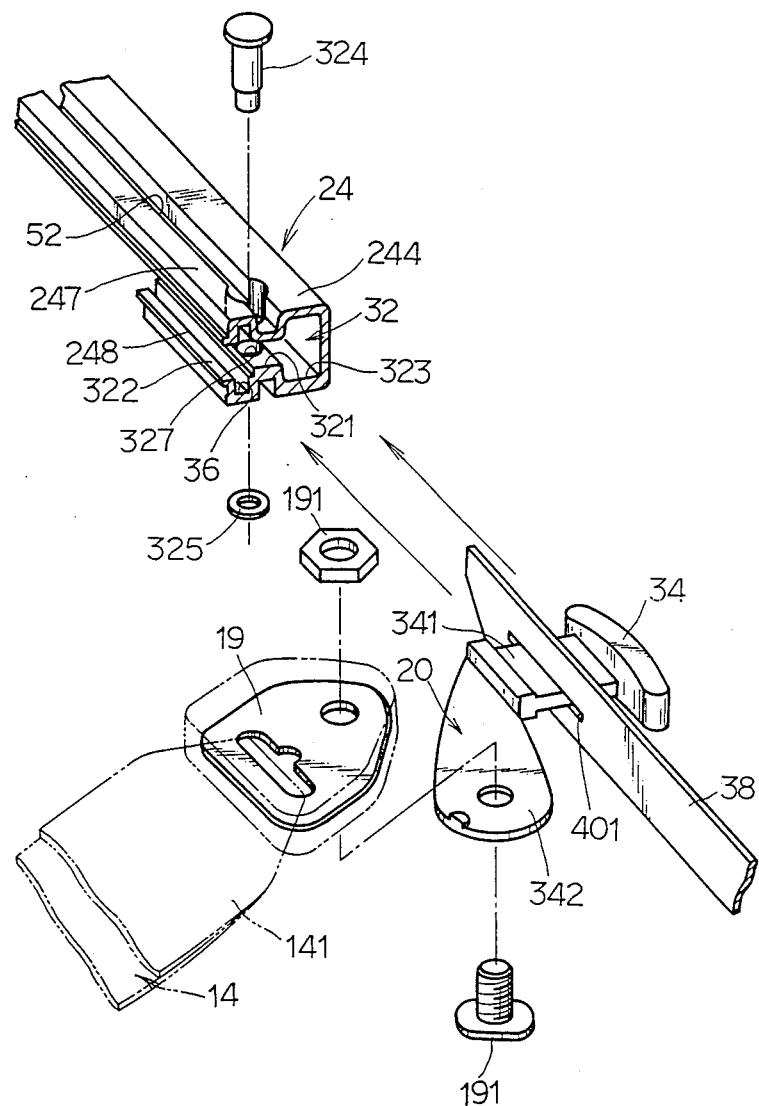
FIG. 4 is an enlarged perspective view of an automatically fastening shoulder restraining webbing assembly of the seatbelt assembly, wherein components of the assembly are disassembled.
Figure 5:
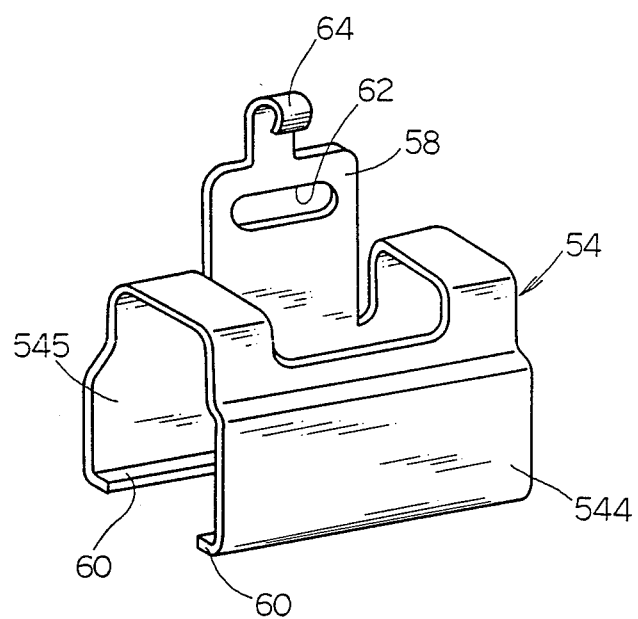
FIG. 5 is an enlarged perspective view of a hanger for holding a guide rail of the assembly shown in FIG. 4.

As shown in FIG. 4, a body portion 341 is inserted into an installing hole 401 defined within a driving tape 38. Further, the body portion 341 is displaceable within the installing hole 401 in the longitudinal direction of the driving tape 38.

Referring back to FIG. 3, the driving tape 38 and the body portion 341 are displaceable throughout a guiding slit 322 which extends along the longitudinal direction of the guide rail 24. The driving tape 38 is displaceable within a tape groove 36, and the driving tape 38 perpendicularly intersects an intermediate portion 321 of the guide groove 32. The tape groove 36 also extends along the longitudinal direction of the guide rail 24. More specifically, the driving tape 38 is displaceable along the tape groove 36 such that the slider 20 can move between a forward portion 245 and a rearward portion 244 of the guide rail 24.

As shown in FIG. 4, the rearward portion 244 of the guide rail 24 includes holes 327 defined within a pair of side walls 247 and 248 of the guide rail 24. An anchor pin 324 is inserted into the holes 327 and the anchor pin 324 is secured to the guide rail 24 by a snap ring 325.

Referring back to FIG. 3, the anchor plate 19 is rotatably connected to a lower end of the leg portion 342 of the slider 20 by a nut and a bolt assembly 191.

The guide rail 24 includes mounting grooves 52 which are longitudinally provided along the guide rail 24. The mounting grooves 52 can be continuously or intermittently formed in both side surfaces of the guide rail 24. Lips 481 of cover member 48 conceal the guiding slit 322 of the guide groove 32 to improve the aesthetic appearance of the seatbelt assembly. Projections 50 of the cover member 48 are received and held within the mounting grooves 52. Further, the cover member 48 includes apertures 482 into which nail portions 60 of a hanger member 54 are inserted.

The hanger member 54 includes a pair of side walls 544 and 545, an upper extension 58 and the nail portions 60. The side walls 544 and 545 hold the cover member 48 and the guide rail 24 therewithin and the nail portions 60 are in contact with bottom portions 249 of the guide rail 24. Further, the upper extension 58 of the hanger member 54 includes a hole 62 and a hook 64. The hanger member 54 is secured to the roof side member 26 by a bolt 63, and the hook 64 of the hanger member 54 holds a wire 46. Accordingly, the guide rail 24 is securely fixed to the roof side member 26 and the wire is extended along the guide rail 24.

Figure 2:
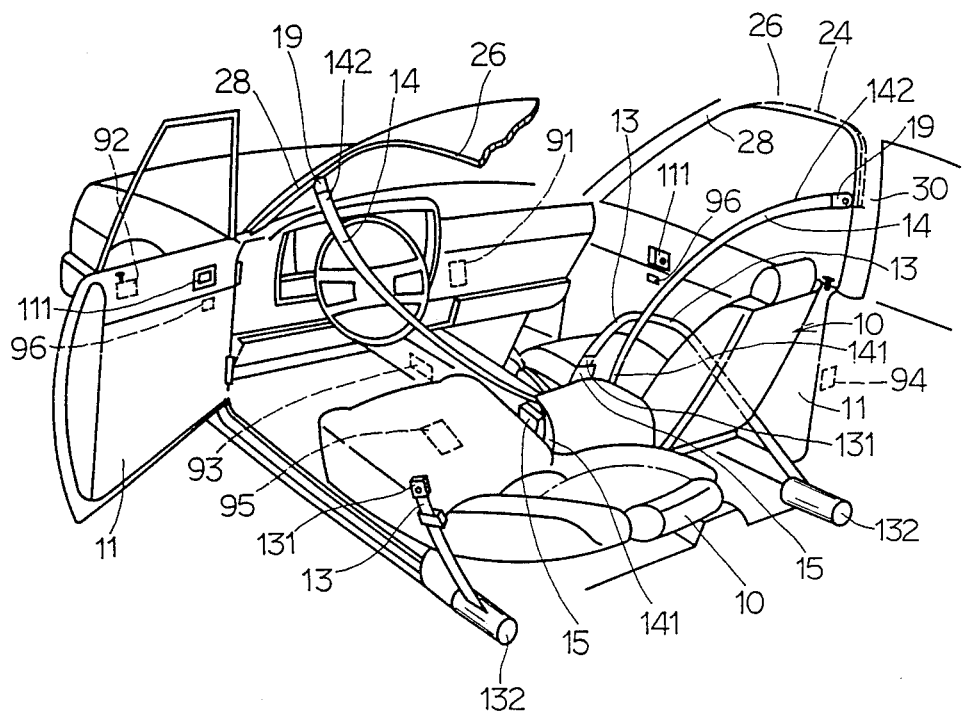
FIG. 2 is a perspective view of the seatbelt assembly, shown in FIG. 1, wherein shoulder and lap restraining webbings of the driver's side are in a release condition, and shoulder and lap restraining webbings of the passenger side are in a restraining condition.

The wire 46 electronically connects a front position sensor 70 and a rear position sensor 82 to an electronic control unit 91 (shown in FIG. 2). The front position sensor 70 is located on the front end 245 of the guide rail 24, and the rear position sensor 82 is located on the rear end 244 of the guide rail 24. The front position sensor 70 and the rear position sensor 82 are fixed to the guide rail 24 by anchor brackets 78 and 80, respectively. The front position sensor 70 and the rear position sensor 82 include actuators (not shown in the drawings) which come into contact with the head portion 34 of the slider 20 when the slider 20 reaches the forward portion 245 or the rearward portion 244 of the guide rail 24. When the slider 20 contacts the actuator of either of the front or rear position sensor 70 or 82, the movement of the slider 20 and the driving tape 28 is terminated.

Furthermore, as shown in FIG. 1, the rearward portion 244 of the guide rail 24 is connected to a tape track 44, which includes a tape groove therein (not shown in the drawings). This tape groove communicates with the tape groove 36 of the guide rail 24. A lower end of the tape track 44 is in contact with a sprocket housing 43, which is secured to a lower portion of the center pillar 30.

Figure 6:
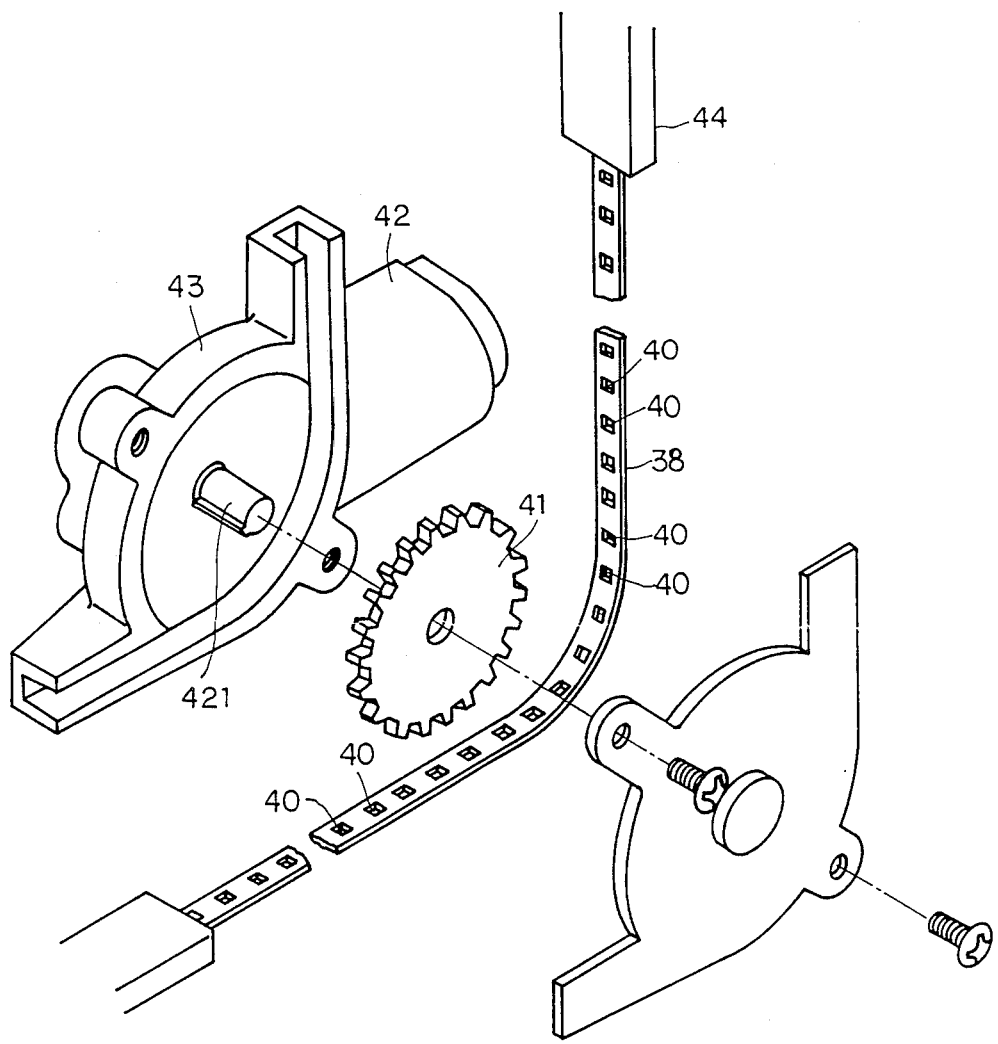
FIG. 6 is an enlarged perspective view of a first actuator mechanism, wherein components of the first actuator mechanism are disassembled.

As shown in FIG. 6, a first actuator mechanism includes a sprocket wheel 41 and a first motor 42. Rectangular openings 40 of the driving tape 38 mesh with the sprocket wheel 41, which is rotatably supported in the sprocket housing 43. The sprocket wheel 41 is adapted to be rotated by an output shaft 421 of the first motor 42, and when the sprocket wheel 41 rotates, it drives the driving tape 38 such that it moves along the tape track 44 and the guide rail 24. The movement of the driving tape 38 causes the slider 20 to move between the forward and rearward portions 245 and 244 of the guide rail 24.

The first motor 42 displaces the driving tape 38 whenever an occupant enters the vehicle or prepares to exit the vehicle. For example, when an occupant sits on the seat 10 of the vehicle and closes the door 11, a door sensor 94 (shown in FIG. 2) outputs a logic level "1" door signal "DS" and a seat sensor 95 (shown in FIG. 2) outputs a logic level "1" seat signal "SS". As a result, the sprocket wheel 41 turns in a clockwise direction (with respect to FIG. 6), whereby the slider 20 is displaced from the forward portions 245 of the guide rail 24 toward the rearward portion 244. When the door 11 is closed, the door sensor 94 outputs the logic level "1" door signal "DS". On the other hand, when the door 11 is opened, the door sensor 94 outputs a logic level "0" door signal. Further, when an occupant 12 sits on the seat 10, the seat sensor 95 outputs the logic level "1" seat signal "SS". On the other hand, when the seat 10 is vacant, the seat sensor 95 outputs a logic level "0" seat signal. The door sensor 94 and the seat sensor 95 are connected electrically to the electronic control unit 91. When the slider 20 reaches the rearward portion 244, the rear position sensor 82 outputs a rear position signal "RS" to the electronic control unit 91, as a result, the slider 20 is stopped.

Conversely, when an occupant opens the door 11, a door sensor 94 outputs the logic level "0" door signal to the electronic control unit 91. As a result, the sprocket wheel 41 turns in a counter-clockwise direction, whereby the slider 20 is displaced from the rearward portion 244 of the guide rail 24 toward the forward portion 245. When the slider 20 reaches the forward portion 245, the front position sensor 70 outputs a front position signal "FS" to the electronic control unit 91, as a result, the slider 20 is stopped.

Figure 7:
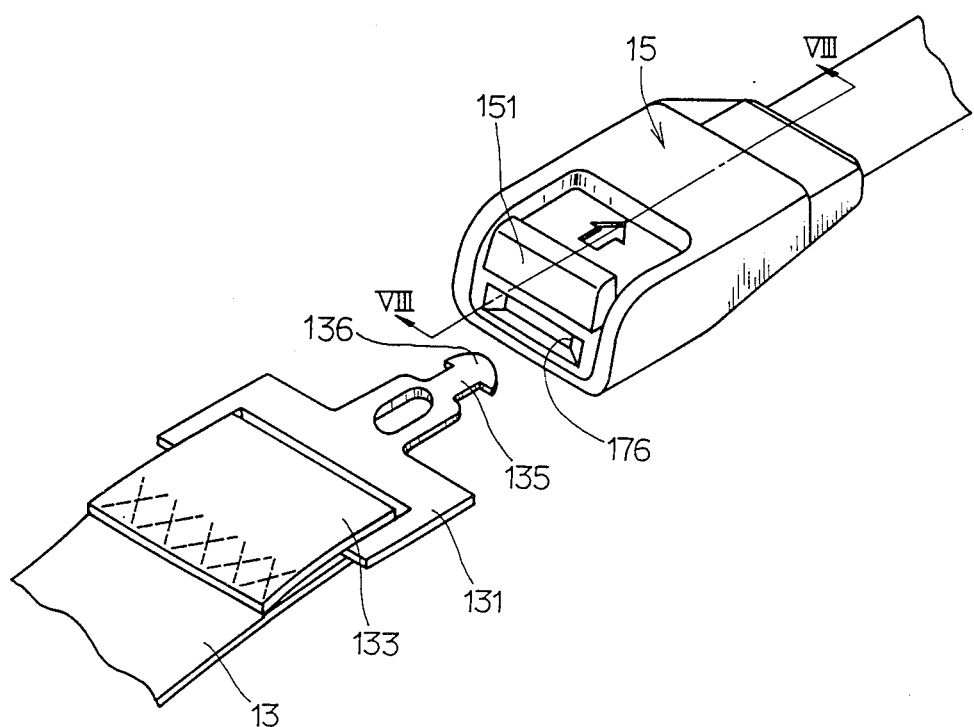
FIG. 7 is an enlarged perspective view of an inner buckle and an engagement plate of the lap restraining webbing.

Referring back to FIG. 1, a lap restraining webbing 13 is designed such that it extends and surrounds the lower body (e.g., lap) of the occupant 12 when the occupant is positioned upon the seat 10. As shown in FIG. 7, an engagement plate 131 which functions as an engagement member is secured to a first end 133 of the lap restraining webbing 13, and a second end of the lap restraining webbing 13 is wound by an outer retractor 132 which functions as second retracting means. The outer retractor 132 is secured to the floor member 16 of the vehicle, and the outer retractor 132 is located at the outer side of the seat 10. The outer retractor 132 includes a locking mechanism which prevents an abrupt windoff of the lap restraining webbing 13 in the emergency situation.

The lap restraining webbing 13 is adapted to be manually fastened to an inner buckle 15 as a buckle means. The inner buckle 15 is secured to the floor member 16 of a vehicle. The inner buckle 15 is located at a substantially central portion in the lateral direction of the vehicle.

Figure 8:
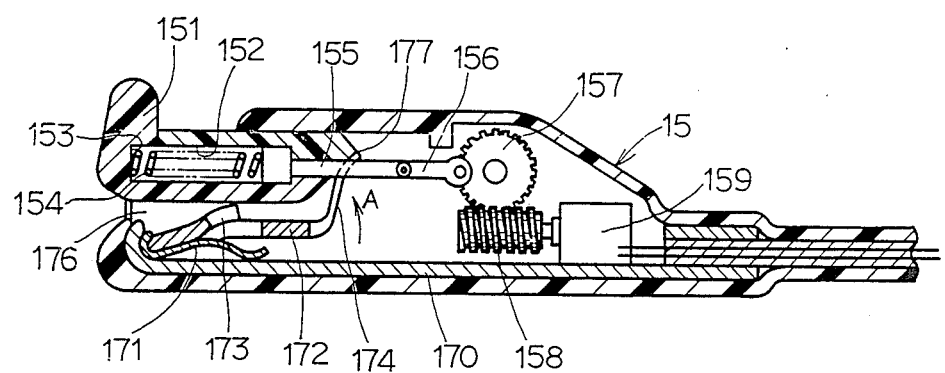
FIG. 8 is an enlarged cross-sectional view of the inner buckle, wherein a release button is positioned at a non-operation position.
Figure 12:
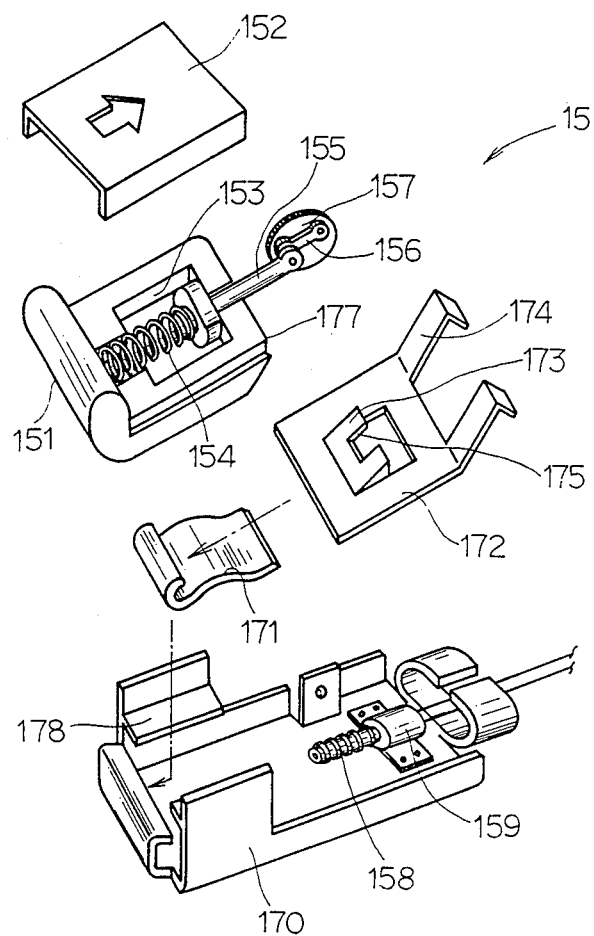
FIG. 12 is an enlarged perspective view of the second actuator mechanism and the inner buckle, wherein components are in a disassembled condition.

As shown in FIGS. 7, 8 and 12, the inner buckle 15 includes a release button 151 as a release means, a locking plate 172 as a locking means, and a second motor 159 as a second actuator means.

The release button 151 includes an inner recess 153, and a compression spring 154 as a first bias means and a first end of a rod 155 as a connecting means are located within the recess 153 of the release button 151. The rod 155 is slidably mounted on the release button 151 and the first end of the rod 155 slides within the recess 153 of the release button 151. The compression spring 154 forces the rod 156 toward the outside of the release button 151. A cover plate 152 covers the recess 153 of the release button 151. Accordingly the compression spring 154 and the first end of the rod 155 are prevented from dropping out from the recess 153 of the release button 151.

A second end of the rod 155 is rotatably connected to a first end of a link 156 and a second end of the link 156 is rotatably connected to a peripheral portion of a worm wheel 157. The worm wheel 157 is rotatably secured to a base plate 170, and the motor 159 is securely mounted on the base plate 170. A worm 158 is secured to an output shaft of the second motor 159 and the worm 158 engages the worm wheel 157. Accordingly, when the second motor 159 is actuated, the worm 158 and the worm wheel 157 are driven.

The locking plate 172 is mounted on the base plate 170 through a leaf spring 171, and the leaf spring 171 forces the locking plate 172 upwardly shown by an arrow "A" in FIG. 8, (i.e., the locking plate 172 is positioned at an engagement portion by the leaf spring 171). The locking plate 172 includes a pawl 173, a notch 175 and a pair of release legs 174. The pawl 173 is located a center portion of the locking plate 172 and the notch 175 is defined within the pawl 173. The pair of release legs 174 extends upwardly from the locking plate 172. When the engagement plate 131 of the lap restraining webbing 13 engages with the locking plate 172, a neck portion 135 of the engagement plate 131 is inserted into the notch 175 of the locking plate 172 and a head portion 136 engages with the pawl 173.

As shown in FIG. 8, when the locking plate 172 and the release button 151 are assembled in the inner buckle 15, the pawl 173 is located between the base plate 170 and the release button 151 and the release legs 174 of the locking plate 173 are in contact with an inner edge 177 of the release button 151. The release button 151 is slidably mounted on a pair of lateral extensions 178 of the base plate 170, and the lateral extension 178 is apart from the base plate 170. As a result, an opening 176 is formed between the release button 151 and the base plate 170, and the engagement plate 131 is inserted into the opening 176 defined within the inner buckle 15, as shown in FIG. 9.

Figure 9:
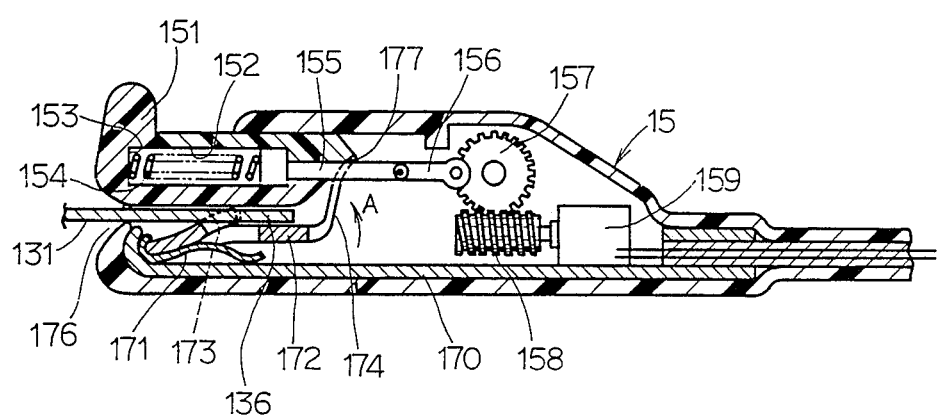
FIG. 9 is an enlarged cross-sectional view of the inner buckle, wherein the engagement plate engages with a locking plate.

FIG. 9 shows an engagement condition in which the locking plate 172 engages with the engagement plate 131. When the second motor 159 is not actuated, the rod 155 and the link 156 are positioned apart from the worm wheel 157. Further, the release button 151 is forced apart from the worm wheel 157 by the compression spring 154. In this engagement condition, the inner edge 177 of the release button 151 is in contact with the release legs 174, because the locking plate 172 is forced upwardly by the leaf spring 171.

Figure 10:
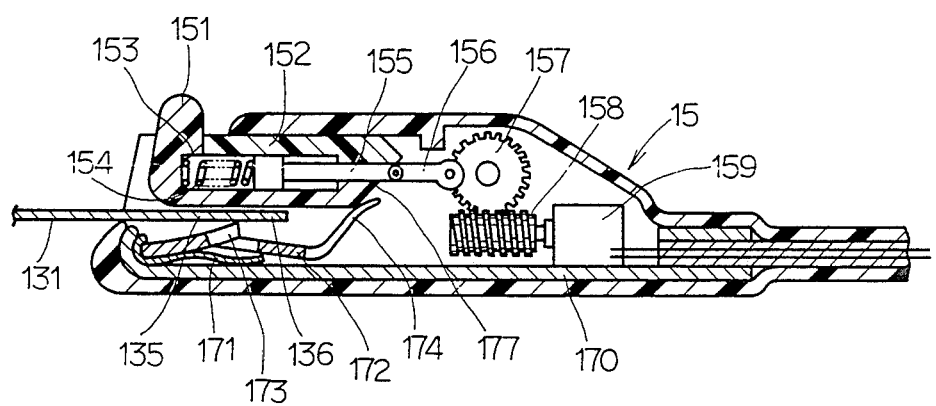
FIG. 10 is an enlarged cross-sectional view of the inner buckle, wherein the release button is pushed into the buckle by a manual operation.

As shown in FIG. 10, when the release button 151 is pushed into the inner buckle 15 by manual operation of an occupant, the rod 155 and the link 156 remain in the same position as in the engagement condition shown in FIG. 9. But the release button 151 is positioned at a disengagement position against the bias force of the compression spring 154. In this disengagement position, the inner edge 177 pushes down the release legs 174 against the bias force of the leaf spring 171. As a result, the pawl 173 of the locking plate 172 is positioned at a disengagement position, and the head portion 136 of the engagement plate 131 is disengaged from the pawl 173 of the locking plate 172.

Figure 11:
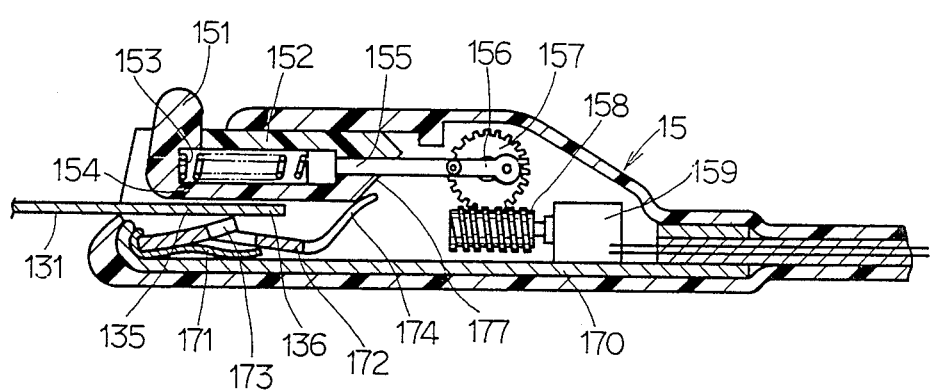
FIG. 11 is an enlarged cross-sectional view of the inner buckle, wherein the release button is pulled into the inner buckle by a second actuator mechanism.

In a similar manner, as shown in FIG. 11, when the second motor 159 is actuated, the worm wheel 157 is rotated by the worm 158. As a result, the rod 155 and the link 156 are positioned at the disengagement position by the rotation of the worm wheel 157, and the release button 151 also is positioned at the disengagement position. Accordingly, the release button 151 makes the engagement plate 131 disengage from the pawl 173 of the locking plate 172.

The second motor 159 is electrically connected to the electronic control unit 91. When the second motor 159 receives a logic level "1" output signal from the electronic control unit 91, the second motor 159 rotates the output shaft, as a result, the locking plate 172 of the inner buckle 15 is disengaged from the engagement plate 131 of the lap restraining webbing 13. Accordingly, an occupant on the seat 10 is released from the restraint of the lap restraining webbing 13.

Figure 13:
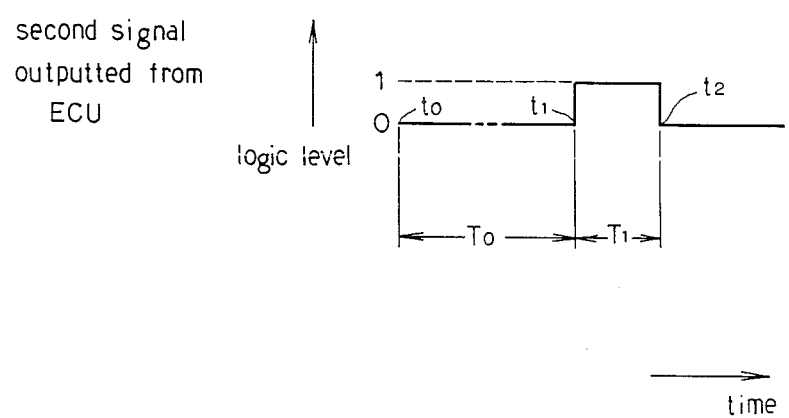
FIG. 13 is a graph showning a second signal outputted from an electronic control unit.

As shown in FIG. 13, the electronic control unit 91 outputs the logic level "1" second output signal during a time period "T$_1$", when the electronic control unit 91 determines an occupant should be released from the restraint of the lap restraining webbing 13.

Figure 14:
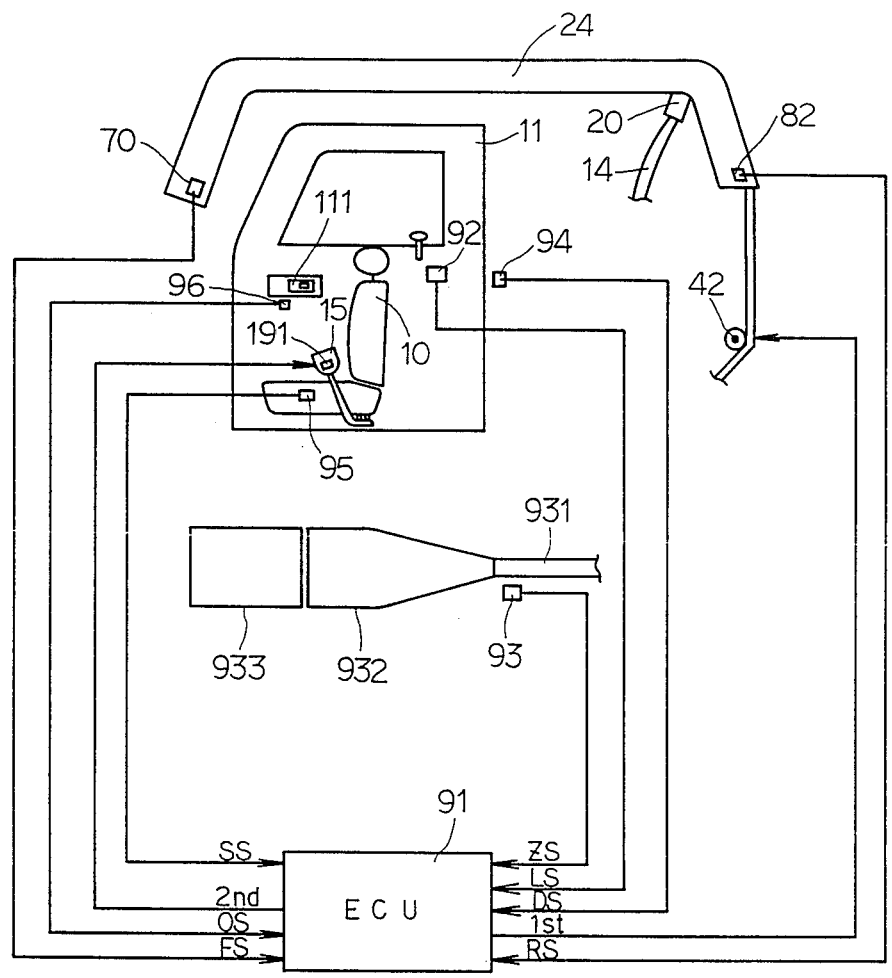
FIG. 14 is a schematic view of the automatic fastening shoulder and lap restraining webbing assembly, wherein sensors and actuator mechanisms are electrically connected to the electronic control unit.

As shown in FIG. 14, the electronic control unit 91 is electrically connected to the front position sensor 70, the rear position sensor 82, the seat sensor 95, the door sensor 94, a door lock sensor 92, a door opening lever sensor 96, a vehicle speed sensor 93, and the first and second motors 42 and 159 of the first and second actuator mechanisms.

The seat sensor 95 is located on a seat cushion of the seat 10, and the seat sensor 95 detects whether an occupant is sitting on the seat 10. When the seat sensor 95 determines that an occupant is sitting on the seat 10, the seat sensor 95 outputs the logic level "1" seat signal "SS".

The door sensor 94 is located in a vehicle body adjacent to the door 11, and the door sensor 94 detects whether the door 11 is closed. When the door 11 is closed, the door sensor 94 outputs the logic level "1" door signal "DS".

The door lock sensor 92 is located adjacent to a door lock mechanism (not shown in drawings), of the door 11, and the door lock sensor 92 detects whether the door lock mechanism is actuated (i.e., in this condition, the door 11 is locked and can not be opened, even when a door opening lever 111 is operated). When the door lock mechanism is released (i.e., in an unlocked condition, the door 11 can be opened, when the door opening lever 111 is operated), the door lock sensor 92 outputs a logic level "1" lock release signal "LS".

The door opening lever sensor 96 is located adjacent to the door opening lever 111 of the door 11, and the door opening lever sensor 96 detects when an occupant operates the door opening lever 111. When the door opening lever 111 is operated, the door opening lever sensor 96 output a logic level "1" release operation signal "OS".

The vehicle speed sensor 93 is located adjacent to an output shaft 931 of a transmission 932 which is connected to an engine 933, and the vehicle speed sensor 93 detects whether the vehicle is stopped. When the vehicle is stopped, the vehicle speed sensor 93 outputs a logic level "1" zero signal "ZS".

When the slider 20 is positioned at the forward portion of the guide rail 24, the front position sensor 70 outputs a logic level "1" front position signal "FS", and when the slider 20 is positioned at the rearward portion of the guide rail 24, the rear position sensor 82 outputs a logic level "1" rear position signal "RS".

Figure 15:
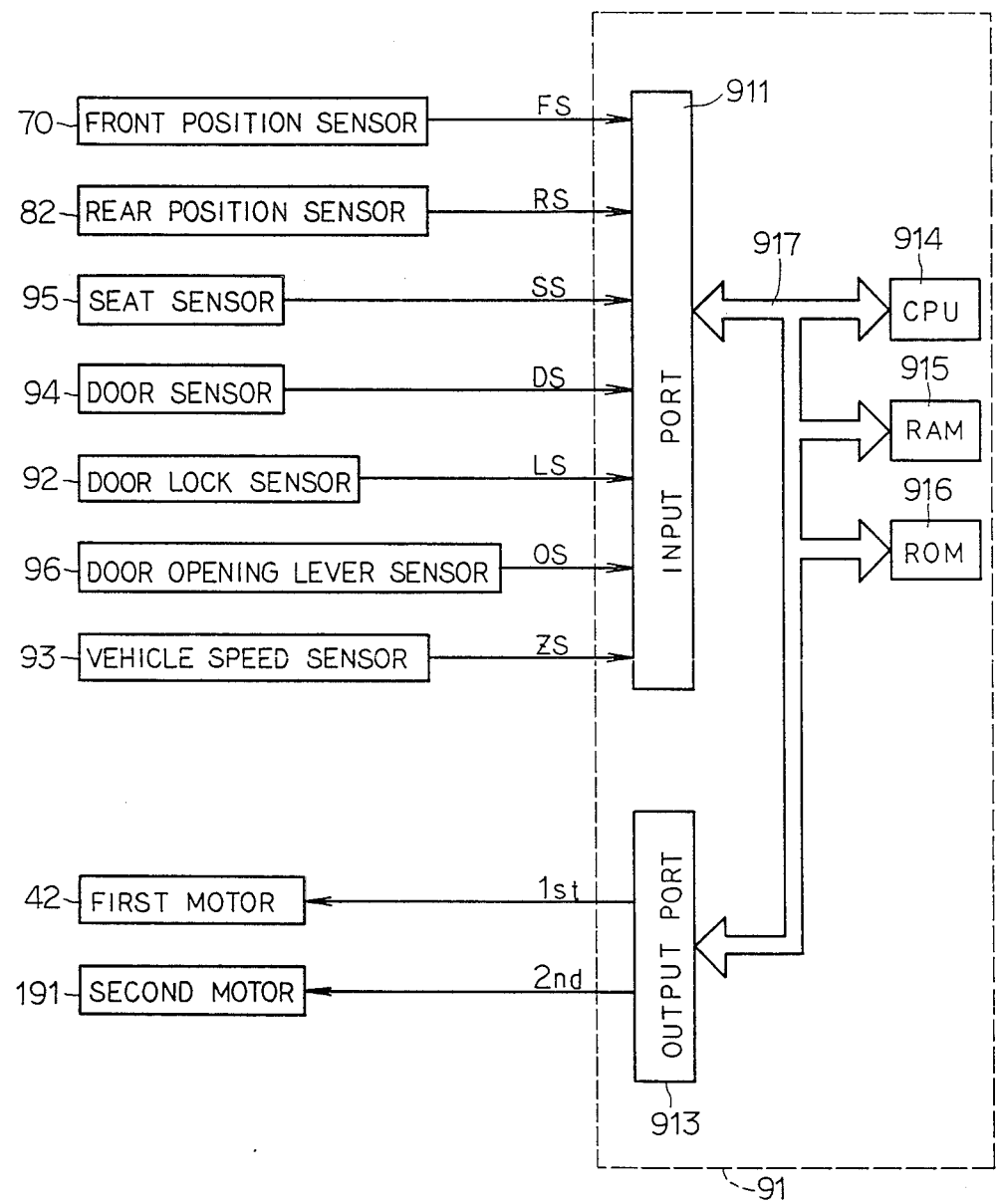
FIG. 15 is a circuit diagram of the electronic control unit employed in the present invention.

As shown in FIG. 15, the electronic control unit 91 includes an input port 911, a central processing unit "CPU" 914, a random access memory "RAM" 915, a read only memory "ROM" 916, and an output port 913. A common bus 917 connects between the input and output ports 911 and 913, the CPU 914, the RAM 915 and the ROM 916.

The front position signal "FS", the rear position signal "RS", the seat signal "SS", the door signal "DS", the lock release signal "LS", the release operation signal "OS" and the zero signal "ZS" are inputted into the input port 911.

The CPU 914 carries out logic processing function, and the RAM 915 temporarily stores the calculated data of the CPU 914. The ROM 916 stores a predetermined control program.

The output port 913 outputs a logic level "1" first signal to the first motor 42 of the first actuator mechanism, and the output port 913 outputs the logic level "1" second signal to the second motor 159 of the second actuator mechanism.

Figure 16:
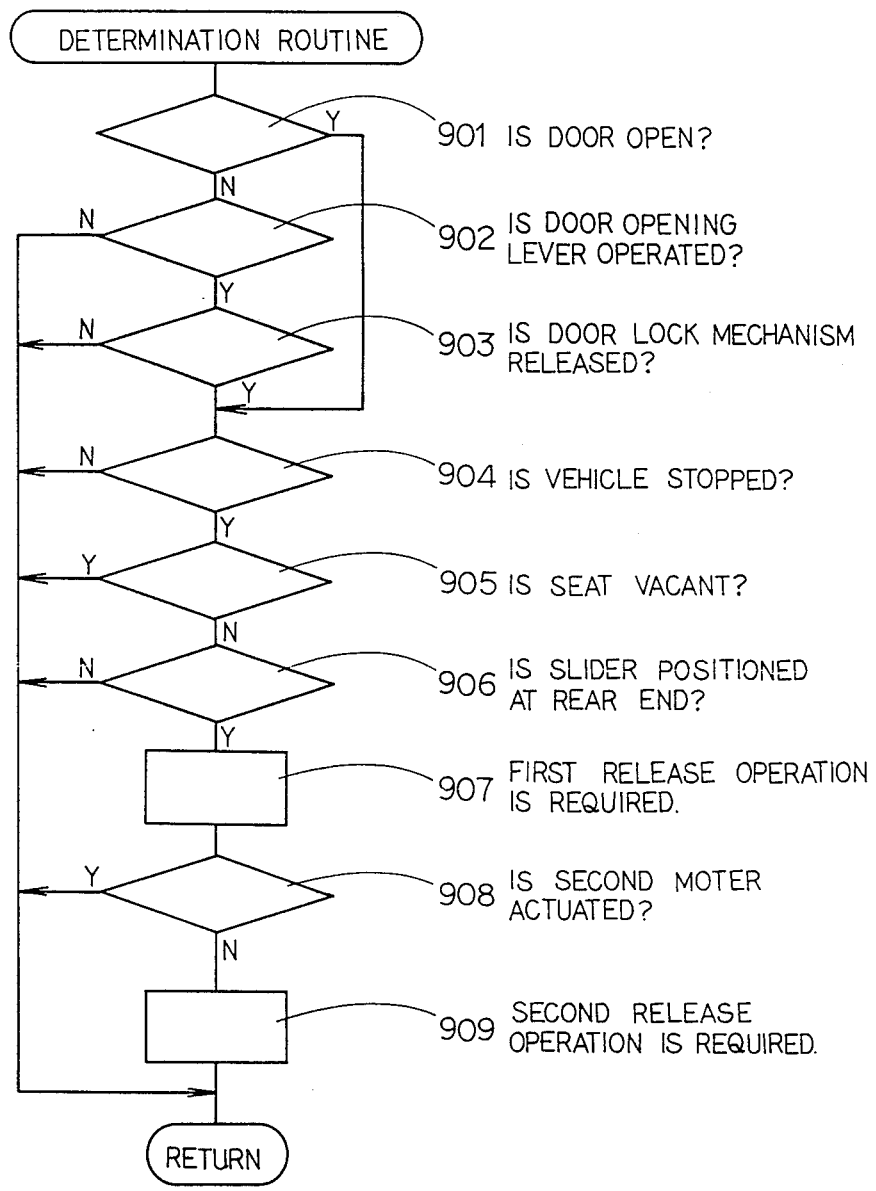
FIG. 16 is a flow chart illustrating a determination routine according to the present invention.
Figure 19:
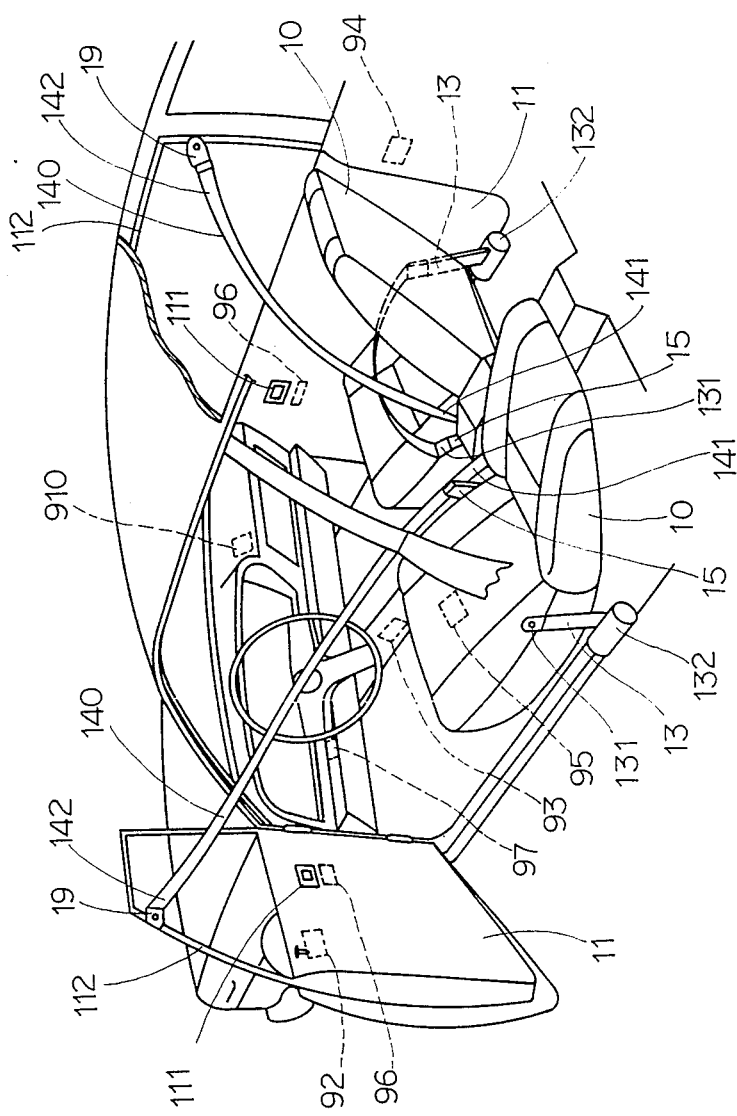
FIG. 19 is a perspective view of a seatbelt assembly of a third embodiment, wherein a lap restraining webbing of the driver's side is in a release condition, and a lap restraining webbing of the passenger side is in a restraining condition.

As shown in FIG. 16, the electronic control unit 91 determines whether first and second release operations are required in accordance with a determination routine.

First, the electronic control unit 91 determines whether the door 11 is open in a first step 901. When the door 11 is opened, a fourth step 904 is processed. On the other hand, when the door 11 is closed, a second step 902 is processed.

In the second step 902, the electronic control unit 91 determines whether the door operating lever 111 is operated. When the door operating lever 111 is not operated, the first step 901 is processed again. On the other hand, when the door operating lever 111 is operated, a third step 903 is processed.

In the third step 903, the electronic control unit 91 determines whether the door lock mechanism is released. When the door lock mechanism is actuated, the first step 901 is processed again. On the other hand, when the door lock mechanism is released (i.e., in the unlock condition), a fourth step 904 is processed.

In the fourth step 904, the electronic control unit 91 determines whether the vehicle is stopped. When the vehicle is not stopped, the first step 901 is processed again. On the other hand, when the vehicle is stopped, a fifth step 905 is processed.

In the fifth step 905, the electronic control unit 91 determines whether the seat 10 is vacant. When the seat 10 is vacant, the first step 901 is processed again. On the other hand, when an occupant sits on the seat 10, a sixth step 906 is processed.

In the sixth step 906, the electronic control unit 91 determines whether the slider 20 is positioned at the rearward portion 244 of the guide rail 24. When the slider 20 is not positioned at the rearward portion 244, the first step 901 is processed again. On the other hand, when the slider 20 is positioned at the rearward portion 244, a first release operation is required in a seventh step 907. As a result, the output port 913 outputs the logic level "1" first signal and the first motor 42 of the first actuator mechanism displaces the slider 20 from the rearward portion 244 to the forward portion 245 of the guide rail 24. Accordingly, an occupant is released from the restraint of the shoulder restraining webbing 14.

After the seventh step 907, a eighth step 908 is processed. In the eighth step 908, the electronic control unit 91 determines whether the second motor 159 of the second actuator mechanism is actuated. When the second motor 159 is actuated, the first step 901 is processed again. On the other hand, when the second motor 159 is not actuated, a second release operation is required in a ninth step 909. As a result, the output port 913 of the electronic control unit 91 outputs the logic level "1" second signal to the second motor 159 of the second actuator mechanism during the time period "$T_1$", and the second motor 159 rotates the worm 158 and the worm wheel 157. Accordingly, the link 156, the rod 155 and the release button 151 are displaced toward the release position. Further, the release button 151 forces the locking plate 172 toward the disengagement position. Therefore, the engagement plate 131 of the lap restraining webbing 13 is disengaged from the inner buckle 15, then, an occupant is released from the restraint of the lap restraining webbing 13.

FIGS. 17 and 18 show a cross-sectional view of an inner buckle 71 of a second embodiment.

The inner buckle 71 is similar to the inner buckle 15 of the first embodiment shown in FIGS. 7 through 12. However, inner buckle 71 includes a different release button 711 and a second actuator 713. The release button 711 includes a tail portion 712 and a leg portion 714, and in an assembled condition, the leg portion 714 is mounted on the release legs 174 of the locking plate 172. When the second actuator 713 is actuated in accordance with the receipt of the logic level "1" second signal, the tail portion 712 of the release button 711 is pulled on the second actuator 713 by a magnet or the like, and the leg portion 714 of the release button 711 pushes down the release legs 174 of the locking plate 172. As a result, the engagement plate 131 of the lap restraining webbing 13 is disengaged from the pawl 173 of the locking plate 172.

In a similar manner, when the release button 711 is pushed into the inner buckle 71, the leg portion 714 of the release button 711 pushes down the release legs 174 of the locking plate 172. Accordingly, the engagement plate 131 of the lap restraining webbing 13 is disengaged from the pawl 173 of the locking plate 172.

FIGS. 19 through 22 show a third embodiment of the present invention. The third embodiment is similar to the first embodiment shown in FIGS. 1 through 16. The most significant difference between the two embodiments is in the shoulder restraining webbing 140. A second end 142 of the shoulder restraining webbing 140 is securely fixed to a door frame 112 of the door 11.

Accordingly, when the door 11 is closed, the shoulder restraining webbing 140 is positioned at a restraining condition (i.e., the second end 142 of the shoulder restraining webbing 140 is positioned behind the seat 11.) On the other hand, when the door 11 is opened, the second end 142 of the shoulder restraining webbing 140 is positioned apart from the seat 11, as a result, the shoulder restraining webbing 140 is positioned at a release condition.

Figure 20:
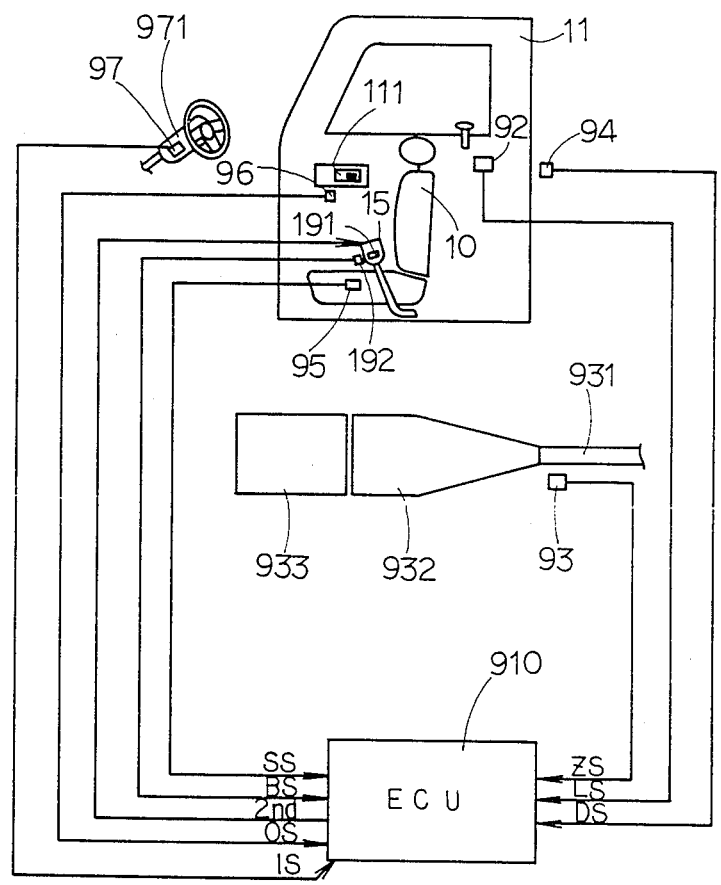
FIG. 20 is a schematic view of the seatbelt system shown in FIG. 19, wherein sensors and actuator mechanism are electrically connected to the electronic control unit.

Further, as shown in FIG. 20, an electronic control unit 910 is electrically connected to the seat sensor 95, the door sensor 94, the door lock sensor 92, the door opening lever sensor 96, the vehicle speed sensor 93, an ignition key sensor 97, a buckle sensor 192 and, the second motor 159 of the second actuator mechanism.

The seat sensor 95, the door sensor 94, the door lock sensor 92, the door opening lever sensor 96, and the vehicle speed sensor 93 function precisely as their counterparts in the first embodiment shown in FIGS. 1 through 16.

The ignition key sensor 97 is located at a steering shaft 971, and the ignition key sensor 97 detects whether an ignition key (not shown in drawings) is inserted into an ignition key cylinder (not shown in drawings). When the ignition key is pulled out from the ignition key cylinder, the ignition key sensor 97 outputs a logic level "1" ignition key signal "IS" to the electronic control unit 910.

The buckle sensor 192 is located in the inner buckle 15, and the buckle sensor 192 detects whether the engagement plate 131 of the lap restraining webbing 13 is engaged with the locking plate 172 of the inner buckle 15. When the engagement plate 131 is engaged with the locking plate 172, the buckle sensor 192 outputs the logic level "1" buckle signal "BS" to the electronic control unit 910.

Figure 21:
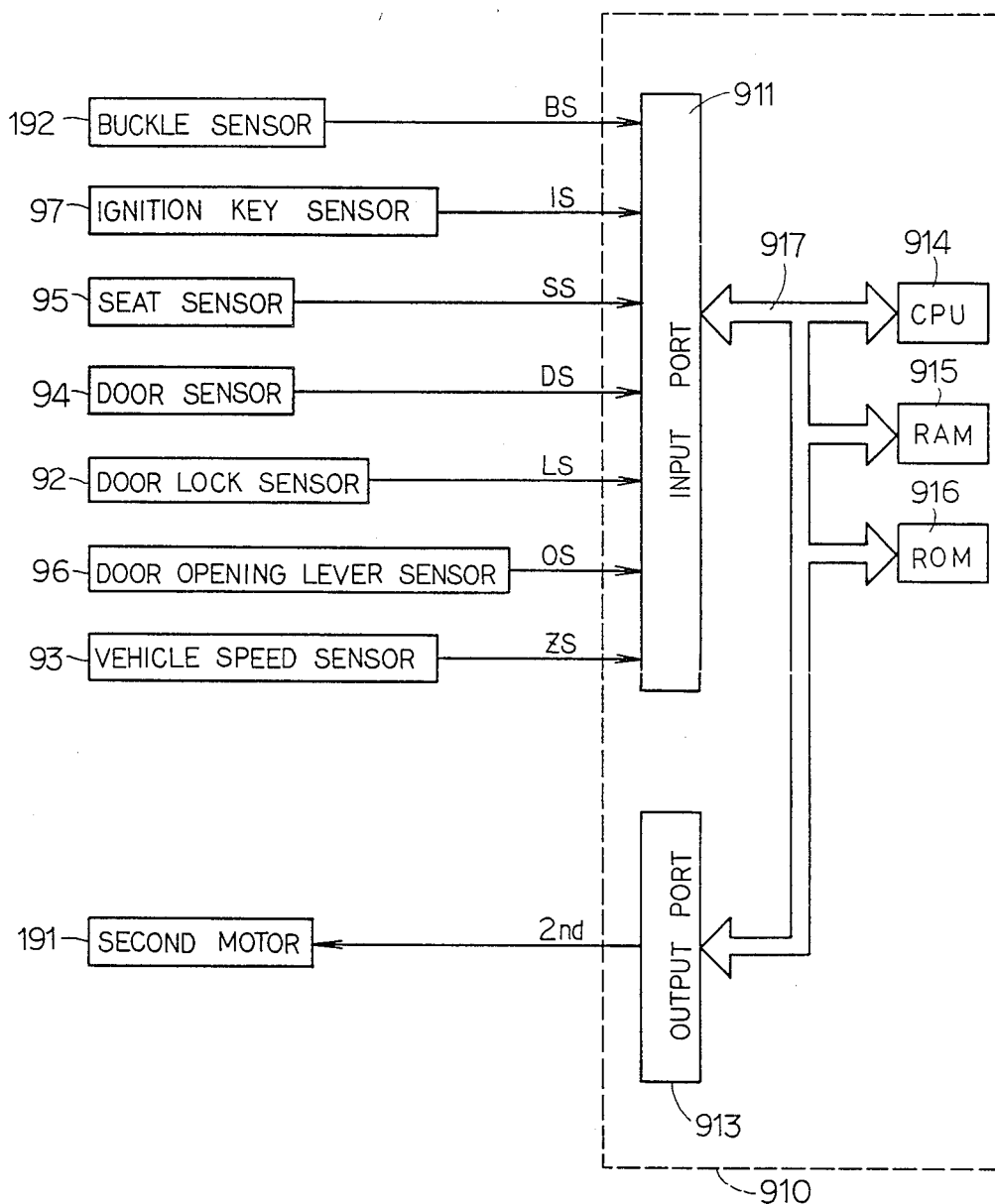
FIG. 21 is a circuit diagram of the electronic control unit employed in the third embodiment.

As shown in FIG. 21, the buckle signal "BS", the ignition key signal "IS", the seat signal "SS", the door signal "DS", the door lock signal "LS", the door operation signal "OS" and the zero signal "ZS" are inputted into the input port 911 of the electronic control unit 910. The second signal is outputted from the output port 913.

Figure 22:
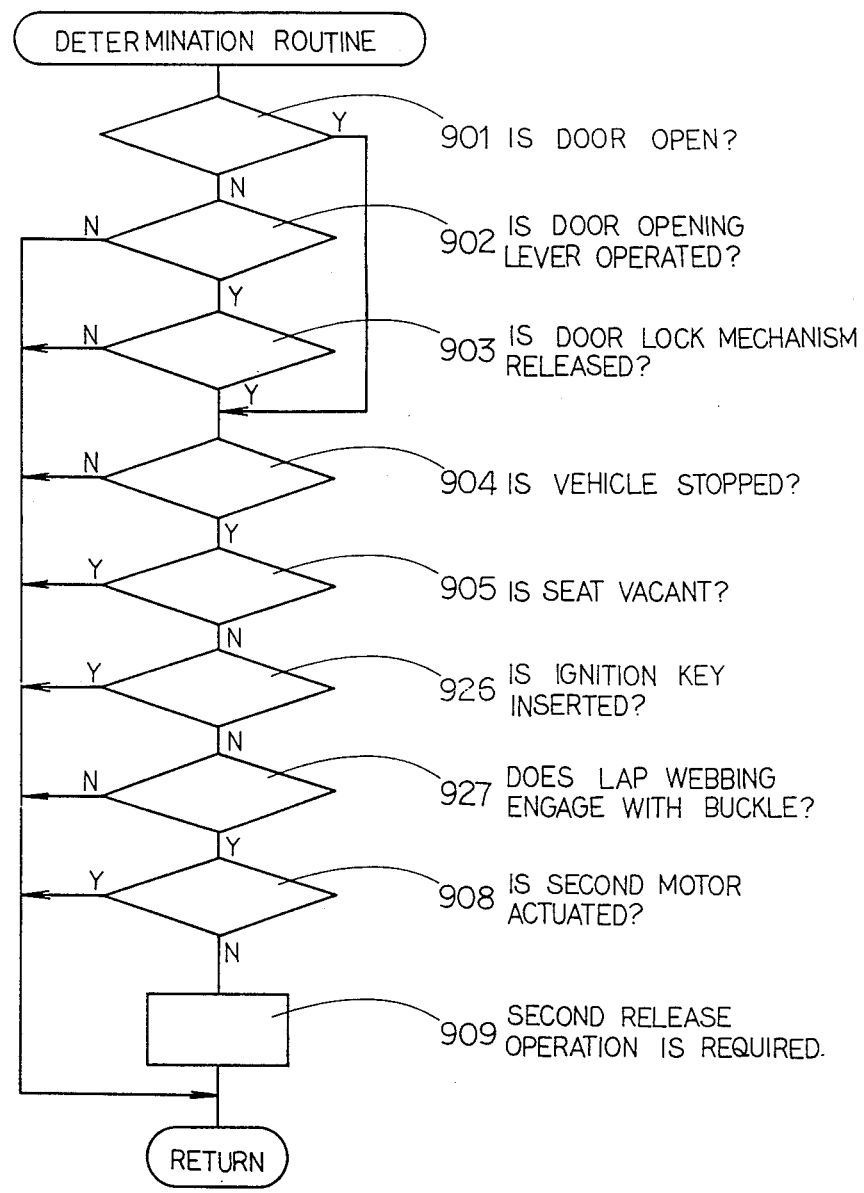
FIG. 22 is a flow chart illustrating a determination routine of the third embodiment.

As shown in FIG. 22, the electronic control unit 910 determines whether the second release operation is required in accordance with a determination routine.

The electronic control unit 910 determines whether the door 11 is open in the first step 901. When the door 11 is open, the fourth step 904 is processed. On the other hand, when the door 11 is closed, the second step 902 is processed.

In the second step 902, the electronic control unit 910 determines whether the door operating lever 111 is operated. When the door operating lever 111 is not operated, the first step 901 is processed again. On the other hand, when the door operating lever 111 is operated, the third step 903 is processed.

In the third step 903, the electronic control unit 910 determines whether the door lock mechanism is released. When the door lock mechanism is actuated, the first step 901 is processed again. On the other hand, when the door lock mechanism is released (i.e., in the unlock condition), the fourth step 904 is processed.

In the fourth step 904, the electronic control unit 910 determines whether the vehicle is stopped. When the vehicle is not stopped, the first step 901 is processed again. On the other hand, when the vehicle is stopped, the fifth step 905 is processed.

In the fifth step 905, the electronic control unit 910 determines whether the seat 10 is vacant. When the seat 10 is vacant, the first step 901 is processed again. On the other hand, when an occupant sits on the seat 10, a sixth step 926 is processed.

In the sixth step 926, the electronic control unit 910 determines whether the ignition key is inserted into the ignition key cylinder. When the ignition key is inserted into the ignition key cylinder, the first step 901 is processed again. On the other hand, when the ignition key is removed from the ignition key cylinder, a seventh step 927 is processed.

In the seventh step 927, the electronic control unit 910 determines whether the engagement plate 131 of the lap restraining webbing 13 is engaged with the locking plate 172 of the inner buckle 15. When the engagement plate 131 is not engaged with the locking plate 172, the first step 901 is processed again. On the other hand, when the engagement plate 131 is engaged with the locking plate 172, the second release operation is required in the ninth step 909. As a result, the output port 913 of the electronic control unit 91 outputs the logic level "1" second signal to the second motor 159 of the second actuator mechanism during the time period "T₁" and the second motor 159 rotates the worm 158 and the worm wheel 157. Accordingly, the link 156, the rod 155 and the release button 151 are displaced toward the release position. Further, the release button 151 forces the locking plate 172 toward the disengagement position. Therefore, the engagement plate 131 of the lap restraining webbing 13 is disengaged from the inner buckle 15 and an occupant is released from the restraint of the lap restraining webbing 13.

As described herein, the present invention overcomes the shortcomings of the known art by providing a seatbelt assembly for automatically releasing an occupant from a seatbelt restraint.

While the present invention has been described in its preferred embodiments, it is to be understood that the invention is not limited thereto, and may be otherwise embodied within the scope of the following claims.

What is claimed is:

1. A seatbelt assembly for automatically releasing a vehicle seat occupant from a restrained condition comprising:

a first restraining webbing means for automatically fastening an occupant to a vehicle seat, said first restraining webbing means being positioned at one of first and second positions, said first restraining webbing means restraining a first portion of an occupant of the seat when said first restraining webbing means is in the first position, and said first restraining webbing means releasing the first portion of the occupant of the seat when said first restraining webbing means moves to the second position,;

a first actuator means for actuating said first restraining webbing means to move between the first and second positions;

a second restraining webbing means for manually fastening a second portion of an occupant to said vehicle seat;

a buckle means being located at a first side of the seat, said second restraining webbing means selectively engaging said buckle means;

said buckle means including a locking means for locking said second restraining webbing means into engagement with said buckle means, and a second actuator means for releasing said second restraining webbing means from said locking means;

a retracting means for winding said second restraining webbing means into a retracted position, said retracting means being located at a second side of the seat, said second restraining webbing means restraining the second portion of an occupant of the seat when said second restraining webbing means is engaged with said buckle means, said second restraining webbing means releasing the second portion of the occupant of the seat when the second restraining webbing means is disengaged from said buckle means; and a first detecting means for detecting when the occupant is getting out of the vehicle, said first detecting means outputting a first signal to said first and second actuator means, said first and second actuator means actuating simultaneously and respectively said first and second restraining webbing means upon receipt of the first signal from said first detecting means, said first actuator means actuating said first restraining webbing means so as to move said first restraining webbing means to the second position upon receipt of the first signal, said second actuator means disengaging said second restraining webbing means from said locking means on the receipt of the first signal to simultaneously release the first and second restraining webbing means respectively from the first and second portions of the occupant.

2. The seatbelt assembly of claim 1, wherein said buckle means further comprises a release means for releasing said second restraining webbing means from said buckle means, said release means being selectively positioned at one of third and fourth positions, said second actuator means displacing said release means from said third position to said fourth position upon receipt of the first signal, said second restraining webbing means including an engagement member, said release means selectively releasing said engagement member from engagement with said locking means, said second restraining webbing means securely engaging said buckle means when said engagement member engages said locking means and said release means is positioned at the third position, and when said engagement member is released from said locking means, said second actuator means displaces said release means from the third position to the fourth position.

3. The seatbelt assembly of claim 2, wherein said buckle means further comprises connecting means for connecting said release means to said second actuator means, said engagement member of said second restraining webbing means being released from said buckle means when said second actuator means receives the first signal and displaces said connecting means and said release means from the third position to the fourth position.

4. The seatbelt assembly of claim 3, wherein said buckle means further comprises a bias member, said release means being slidably mounted on said connecting means, said bias means biassing said release means away from said second actuator means, said release means being biased toward the third position when said second actuator means does not receive the first signal, said release means being forced toward the fourth position against the force of said bias member when a manual force opposing said bias member is applied to said release means, even when said connecting means is positioned at the third position.

5. A seatbelt assembly for automatically releasing a vehicle seat occupant from the restraint of first and second restraining webbing means for restraining the occupant, comprising:
   a guide rail having a longitudinal groove therein, said guide rail being located at a first side of a vehicle seat;
   a slider being displaceable along said longitudinal groove of said guide rail, said first restraining webbing means being fixed at a first end thereof to said slider, said slider being selectively positioned at one of first and second positions;
   a first actuator means displacing said slider along said guide rail;
   a first retracting means for winding a second end of said first restraining webbing means, said first retracting means being located at a second side of the vehicle seat, said slider being positioned at the first position when the occupant of the vehicle seat is restrained by said first restraining webbing means;
   a buckle means located adjacent to said first retracting means, said second restraining webbing means selectively engaging said buckle means;
   said buckle means comprising a locking means for locking the second restraining webbing means, and a second actuator means for releasing said second restraining webbing means from said locking means;
   a second retracting means for winding said second restraining webbing means, said second retracting means being located at said first side of the vehicle seat, an occupant of the vehicle seat being restrained by said second restraining webbing means when said second restraining webbing means engages said buckle means, and the occupant of the vehicle seat being released from the restraint of said first and second restraining webbing means simultaneously when said slider is positioned at the second position and said second restraining webbing means and said buckle means are disengaged; and
   a first detecting means for detecting when the occupant is getting out of the vehicle, said first detecting means outputting first and second signals simultaneously to said first and second actuator means respectively, said first and second actuator means simultaneously and respectively displacing said slider from the first position to the second position and disengaging said locking means from said second restraining webbing means when said first detecting means outputs the first and second signal to said first and second actuator means to simultaneously release said first and second restraining webbing means from said occupant.

6. The seatbelt assembly of claim 5, wherein said buckle means further comprises a release means for releasing said buckle means from said second restraining webbing means, said release means being selectively positioned at one of third and fourth positions, said second actuator means displacing said release means from said third position to said fourth position upon receipt of the first signal, said second restraining webbing means including an engagement member, said release means selectively releasing said engagement member from engagement with said locking means, said second restraining webbing means securely engaging said buckle means when said engagement member engages said locking means and said release means is positioned at the third position, and said engagement member is released from said locking means when said second actuator means displaces said release means from the third position to the fourth position.

7. The seatbelt assembly of claim 6, wherein said buckle means further comprises connecting means for connecting said release means to said second actuator means, said engagement member of said second restraining webbing means being released from said buckle means when said second actuator means receives the first signal and displaces said connecting means and said release means from the third position to the fourth position.

8. The seatbelt assembly of claim 7, wherein said buckle means further comprises a first bias member, said release means being slidably mounted on said connecting means, said first bias means biassing said release means away from said actuator means, said release means being biased toward the third position when said second actuator means does not receive the first signal, said release means being forced toward the fourth position against the force of said bias member when a manual force opposing said bias member is applied to said release means, even when said connecting means is positioned at the third position.

9. A seatbelt assembly for automatically releasing a vehicle seat from the restraint of first and second restraining webbing means for restraining a vehicle occupant, comprising:
   a guide rail having a longitudinal groove therein, said guide rail being located at a first side of a vehicle seat;
   a slider being displaceable along said longitudinal groove of said guide rail, said first restraining webbing means being fixed at a first end thereof to said slider, and said slider selectively positioned at one of first and second positions;
   a first actuator means for displacing said slider along said guide rail;
   a first retracting means for winding a second end of said first restraining webbing means, said first retracting means being located at a second side of the vehicle seat, the occupant of the vehicle seat being restrained by said first restraining webbing means when said slider is positioned at the first position;
   a buckle means for locking said second restraining webbing means located adjacent to said first retracting means, said second restraining webbing means selectively engaging said buckle means, said buckle means comprising a locking means and a second actuator means for releasing said second restraining webbing means from said locking means;

a second retracting means for winding said second restraining webbing means, said second retracting means being located at said first side of the vehicle seat, said occupant of the vehicle seat being restrained by said second restraining webbing means simultaneously when said second restraining webbing means engages said belt means, and said occupant of the seat being released from the restraint of the first and second restraining webbing means when said slider is positioned at the second position and said second restraining webbing means and said buckle means are disengaged;

a first detecting means for detecting when the occupant is getting out of the vehicle, said first detecting means outputting a first signal;

a second detecting means for detecting vehicle speed, said second detecting means outputting a second signal;

a third detecting means for detecting when a door locking mechanism is unlocked, said third detecting means outputting a third signal; and a control means for controlling said first and second actuator means, said control means receiving the first, second and third signals, and outputting fourth and fifth signals simultaneously to said first and second actuator means respectively, said first actuator means displacing said slider from the first position to the second position and said second actuator means disengaging said locking means from said second restraining webbing means to simultaneously release said first and second restraining webbing means from said occupant.

10. The seatbelt assembly of claim 9, wherein said buckle means further comprises a release means for releasing said second restraining webbing means from said buckle means, said release means being selectively positioned at one of third and fourth positions, said second actuator means displacing said release means from said third position to said fourth position upon receipt of the fifth signal, said second restraining webbing means including an engagement member, said release means selectively releasing said engagement member from engagement with said locking means, said second restraining webbing means securely engaging said buckle means when said engagement member engages said locking means and said release means is positioned at the third position, and said engagement member being released from said locking means when said second actuator means displaces said release means from the third position to the fourth position.

11. The seatbelt assembly of claim 10, wherein said buckle means further comprises a connecting means for connecting said release means to said second actuator means, said engagement member of said second restraining webbing means being released from said buckle means when said second actuator means receives the fourth signal and displaces said connecting means and said release means from the third position to the fourth position.

12. The seatbelt assembly of claim 11, wherein said buckle means further comprises a first bias member, said release means being slidably mounted on said connecting means, said first bias means biasing said release means away from said second actuator means, said release means being biased toward the third position when said second actuator means does not receive the fourth signal, said release means being forced toward the fourth position against the force of said bias member when a manual force opposing said first bias member is applied to said release means, even when said connecting means is positioned at the third position.

13. A seatbelt assembly for automatically releasing a vehicle seat occupant from the restraint of first and second restraining webbing means for restraining a vehicle seat occupant, comprising:

a door swingably mounted on a vehicle, said first restraining webbing means being fixed at a first end thereof to said door, said door selectively positioned at one of a closed position and an open position, said door being located at a first side of a vehicle seat;

a first retracting means for winding a second end of said first restraining webbing means, said first retracting means being located at a second side of the vehicle seat, the vehicle seat occupant being restrained by the first restraining webbing means when said door is in the closed position;

a buckle means being located adjacent to said first retracting means, said second restraining webbing means selectively engaging said buckle means, said buckle means comprising a locking means and a first actuator means for releasing said second restraining webbing means from said locking means;

a second retracting means for winding said second restraining webbing means, said second retracting means being located at said first side of the vehicle seat, the occupant being restrained by said second restraining webbing means when said second restraining means engages said buckle means, and said occupant being released from the restraint of said first and second restraining webbing means simultaneously when said door is in the open position and said second restraining means and buckle means are disengaged;

a first detecting means for detecting when the occupant is getting out of the vehicle, said first detecting means outputting a first signal;

a second detecting means for detecting vehicle speed, said second detecting means outputing a second signal;

a third detecting means for detecting when a door locking mechanism is unlocked, said third detecting means outputting a third signal; and a control means for controlling said first actuator means, said control means receiving said first, second and third signals, and outputting a fourth signal to said first actuator means, said first actuator means disengaging said locking means from said second restraining webbing means upon receipt of the fourth signal from the control means and simultaneous with the occupant's release from the first restraining webbing means.

14. The seatbelt assembly of claim 13, wherein said buckle means further comprises a release means for releasing said second restraining webbing means from said buckle means, said release means being selectively positioned at one of third and fourth positions, said first actuator means displacing said release means from said third position to said fourth position upon receipt of the fourth signal, said second restraining webbing means including an engagement member, said release means selectively releasing said engagement member from engagement with said locking means, said second restraining webbing means securely engaging said buckle means when said engagement member engages said locking means and said release means is positioned at the third position, and said engagement member being released from said locking means when said first actuator means displaces said release means from the third position to the fourth position.

15. The seatbelt assembly of claim 14, wherein said buckle means further comprises a connecting means for connecting said release means to said first actuator means, said first actuator means displacing said connector means and said release means from the third position to the fourth position upon receiving the fourth signal, and releasing said engagement member of said second restraining webbing means from said buckle means.

16. The seatbelt assembly of claim 15, wherein said buckle means further comprises a first bias member, said release means being slidably mounted on said connecting means, said first bias means biassing said release means away from said first actuator means, said release means being biased toward the third position when said first actuator means does not receive the fourth signal, said release means being forced toward the fourth position against the force of said first bias member when a manual force opposing said first bias member is applied to said release means, even when said connecting means is positioned at the third position.

17. A seatbelt assembly for automatically releasing a vehicle seat occupant from the restraint of first and second restraining webbing means for restraining the occupant, comprising:
 a guide rail having a longitudinal groove therein, said guide rail being located at a first side of a vehicle seat;
 a slider being displaceable along said longitudinal groove of said guide rail, said first restraining webbing means being fixed at a first end thereof to said slider, said slider selectively positioned at one of first and second positions;
 a first actuator means displacing said slider along said guide rail;
 a first retracting means for winding a second end of said first restraining webbing means, said first retracting means being located at a second side of the vehicle seat, the vehicle occupant being restrained by said first restraining webbing means when said slider is positioned at the first position;
 a buckle means being located at the first side of the seat, said second restraining webbing means selectively engaging said buckle means, said buckle means comprising a locking means and a second actuator means for releasing said second restraining webbing means from said locking means;
 a second retracting means for winding said second restraining webbing means, said second retracting means located at a second side of the seat, the vehicle occupant being restrained by said second restraining webbing means when said second restraining means engages said buckle, and the vehicle occupant being released from the restraint of the second restraining webbing means when said second restraining webbing means and said buckle are disengaged;
 a first detecting means for detecting when the occupant is getting out of the vehicle, said first detecting means outputting a first signal;
 a second detecting means for detecting a vehicle speed, said second detecting means outputting a second signal; and
 a control means for controlling said first and second actuator means, said control means receiving the first and second signals and outputting a third signal to said second actuator means, said second actuator means disengaging said locking means from said second restraining webbing means simultaneously with said first actuator means moving said slider to said second position.

18. The seatbelt assembly of claim 17, wherein said buckle means further comprises a release means to release the second restraining webbing means from the buckle means, said release means being selectively positioned at one of first and second positions, said second actuator means displacing said release means from said first position to said second position upon receipt of the third signal, said second restraining webbing means including an engagement member, said release means selectively releasing said engagement member from engagement with said locking means, said second restraining webbing means securely engaging said buckle means when said engagement member engages said locking means and said release member is positioned at the first position, and said engagement member being released from engagement with said locking means when said second actuator means displaces said release means from the first position to the second position.

19. The seatbelt assembly of claim 18, wherein said buckle means further comprises a connecting means for connecting said release means to said second actuator means, said second actuator means displacing said connecting means and said release means from the first position to the second position when the third signal is received, and releasing said engagement member of said second restraining webbing means from said buckle means.

20. The seatbelt assembly of claim 19, wherein said buckle means further comprises a first bias member, said release means being slidably mounted on said connecting means, said first bias means biassing said release means away from said second actuator means, said release means being biased toward the first position when said second actuator means does not receive the third signal, the release means being forced toward the second position against the force of said first bias means when a manual force is applied to said release means, even when said connecting means is in the first position.

* * * * *